United States Patent
Manger

[11] Patent Number: 5,937,741
[45] Date of Patent: Aug. 17, 1999

[54] AUTOMATIC PASTA PREPARER

[76] Inventor: William M. Manger, 8 E. 81st St., New York, N.Y. 10028

[21] Appl. No.: 08/992,016

[22] Filed: Dec. 17, 1997

[51] Int. Cl.[6] .............................. A47J 27/00; A47J 27/10; A47J 27/18; A47J 37/12
[52] U.S. Cl. ............................................... 99/336; 99/407
[58] Field of Search .................... 99/330, 331, 334–336, 99/403, 407–413, 427; 426/523, 402, 462, 507, 509, 510

[56] References Cited

U.S. PATENT DOCUMENTS

| | | | |
|---|---|---|---|
| 1,284,454 | 11/1918 | Reinert et al. | 99/336 |
| 1,377,983 | 5/1921 | Lamb | 99/336 |
| 3,690,246 | 9/1972 | Guthrie, Sr. | 99/410 X |
| 3,821,925 | 7/1974 | Moore | 99/327 |
| 3,827,344 | 8/1974 | Pratolongo | 99/352 |
| 4,803,916 | 2/1989 | Tacconi | 99/352 |
| 4,803,917 | 2/1989 | Barbieri | 99/356 |
| 4,951,558 | 8/1990 | Figliuzzi | 99/403 X |
| 5,142,966 | 9/1992 | Morandi et al. | 99/352 |
| 5,191,829 | 3/1993 | Caffarella | 99/352 |
| 5,313,876 | 5/1994 | Hilger et al. | 99/330 |
| 5,347,917 | 9/1994 | Vezzani et al. | 99/335 |
| 5,469,778 | 11/1995 | Prudhomme | 99/336 |

*Primary Examiner*—Timothy F. Simone
*Attorney, Agent, or Firm*—Porter F. Fleming; Hopgood Calimafde Kalil & Judlowe

[57] ABSTRACT

A food preparer includes a basket for holding the food to be prepared inserted within an outer receptacle. A timer-controllable mechanism raises the food basket out of boiling water contained in the outer receptacle after a predetermined time interval.

3 Claims, 2 Drawing Sheets

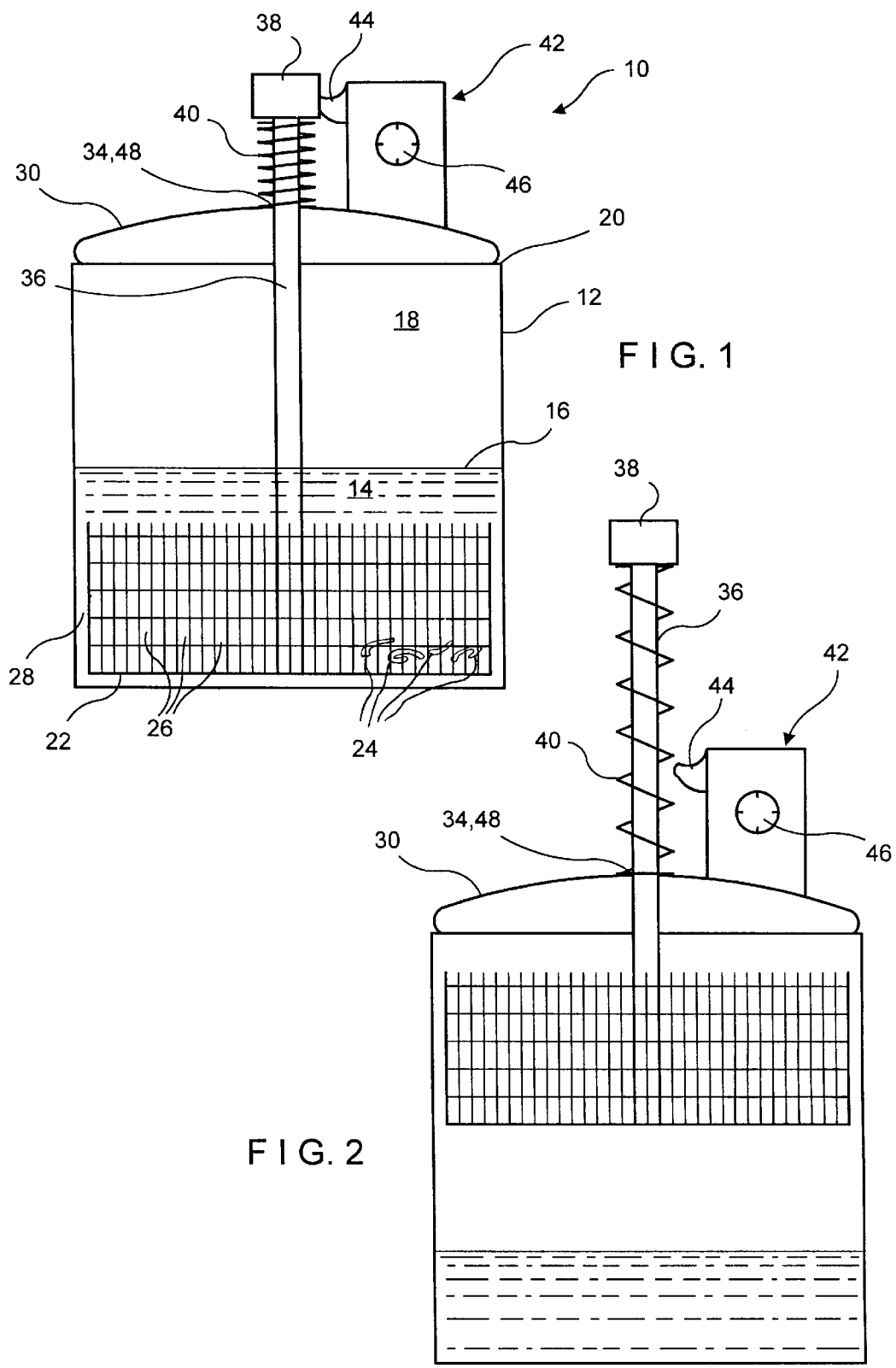

AUTOMATIC PASTA PREPARER

FIELD OF THE INVENTION

The invention relates generally to food preparation, and more specifically to a device for cooking pasta and other food products for an automatically controlled period of time.

BACKGROUND OF THE INVENTION

In the cooking of many food products, such as pasta and some vegetables, such as broccoli, the food product is placed in boiling water and kept there for a period of time. The time the food is boiled generally determines the doneness of the food at the completion of the boiling process. Particularly in the preparation of pasta, which many people prefer to be al dente in consistency, the pasta must not be kept in the boiling water for either too short or too long a period of time. Otherwise the pasta will be either too hard or too soft as the case may be.

The standard method of simply watching the clock to know when to remove the pasta from the boiling water at the appropriate time is often unreliable, and requires the cook to pay close attention to the clock. This is often not feasible, particularly when the cook is performing other functions at that time such as preparing the sauce that is to be poured over the cooked pasta. The use of a kitchen timer set to the desired cooking time is helpful as it gives the cook an indication, such as a beeping signal, that the desired cooking period has been completed. However, the cook must then stop whatever he or she is doing at that time, and immediately direct his or her attention to the pasta, which must then be quickly removed from the boiling water. This may create a dilemma for the cook who at that time may be engaged in another activity that demands his or her complete attention.

Devices have been designed that prepare uniformly prepared pasta in large quantities. In some of these devices the pasta remains in the boiling water for a desired time. However, these devices are relatively complex industrial machines that include packaging and pasta transfer devices. An example of such an industrial pasta-preparing device is disclosed in U.S. Pat. No. 4,732,080 to Vita. The complexity and cost of such an industrial pasta maker make it prohibitive for use in a residential kitchen. Other devices for automatic cooking that are capable of removing pasta from boiling water after a predetermined duration are disclosed, for example, in U.S. Pat. Nos. 5,361,684 to Cattaneo and 4,951,558 to Figliuzzi. These devices also take up considerable space, both in terms of storage and in terms of counter/work space, and are also not readily useful in a home kitchen.

There thus remains a need for a device that can be used by the amateur cook to prepare perfectly prepared pasta and vegetables in a relatively automated manner, and which does not require the cook's constant attention.

OBJECTS OF THE INVENTION

It is thus an object of the invention to provide an automatic food preparer that will automatically remove pasta from boiling water after a predetermined interval.

It is another object of the invention to provide an automatic food preparer that is suitable in size and cost and ease of operation for use in a residential kitchen.

SUMMARY OF THE INVENTION

The automated food preparer of the invention includes an outer receptacle for holding an amount of boiling water, and a cooking basket adapted to hold the food product to be cooked. The basket is received within the outer receptacle for immersion into the boiling water. A timer set by the user is coupled to a control member. At the expiration of the desired, preset cooking interval the timer activates the control member in a manner to raise the basket and the food contained in the basket out of the boiling water, thereby to end the cooking process.

BRIEF DESCRIPTION OF THE DRAWINGS

The above-mentioned and other objects and advantages will become apparent to one skilled in the art upon reading the following detailed description of preferred embodiments of the invention as considered along the appended drawings, in which:

FIG. 1 is an elevation view of a food processor according to a preferred embodiment of the invention as used to prepare pasta, with pasta basket immersed in the boiling water.

FIG. 2 is an elevation view of the embodiment of FIG. 1 in which the pasta basket is raised out of the water;

DETAILED DESCRIPTION OF THE PREFERRED EMBODIMENTS

Figure 3:
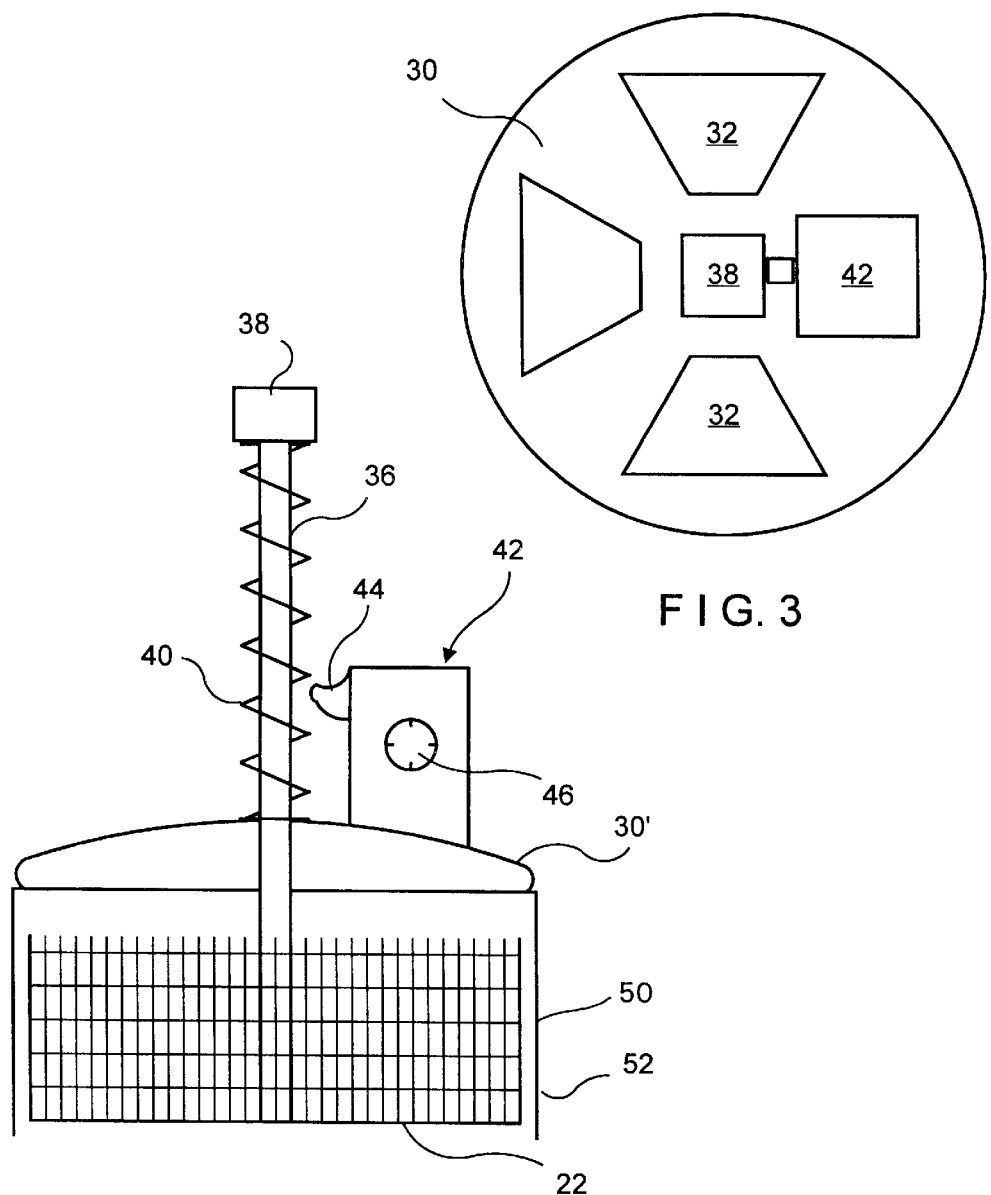
FIG. 3 is a top view of the embodiment of FIG. 1.
Figure 4:
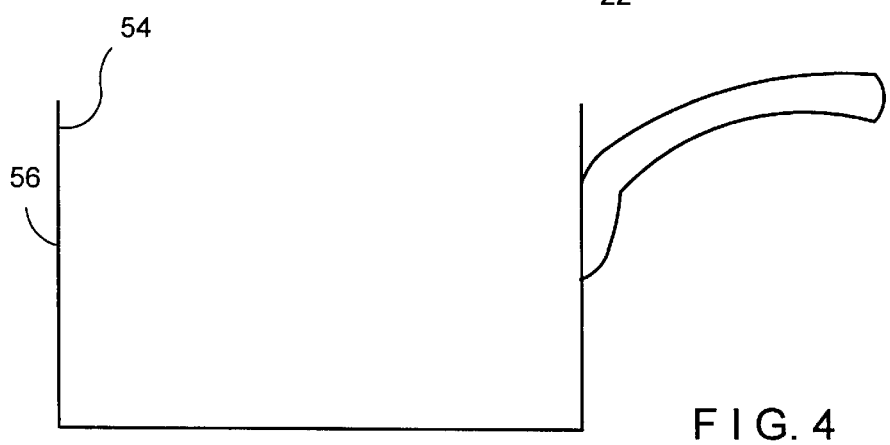
FIG. 4 is an elevation view of an alternate embodiment of the present invention shown positioned above a sauce pot.

In the embodiment of the invention as illustrated in FIGS. 1–3, an automatic food preparer generally designated 10 includes an outer pot 12 formed of any standard cookware material that is capable of withstanding and evenly distributing the heat of a stove-top burner or electric element (not shown). In order to cook pasta, for which the present invention is particularly well suited, an amount of water 14 (eventually brought to a boil) is placed within the bottom portion of outer pot 12. The water level 16 of the water in the outer pot 12 permits an air space 18 to exist above the water 14 but below the top edge 20 of the outer pot 12.

A food receptacle, here shown as a basket 22, is placed in the interior of pot 12, and the food to be cooked, such as pasta 24, is placed within the basket. Basket 22, which may be of any shape, includes small (about 3–4 mm in diameter) apertures 26 in its side and bottom walls such that the boiling water 14 can freely circulate within basket 22. The apertures 26 in the basket also allow the water 14 to drain out from the pasta 24 when the basket 22 is elevated and removed from the water 14 in the manner described below. The height of basket 22 is preferably no more than half the height of the outer pot 12 and its diameter is preferably only slightly less than that of the outer pot 12. The gap 28 between basket 22 and outer pot 12, as a result of the difference in their diameters, is preferably sufficiently narrow to prevent pasta 24 from falling out of the basket and into the gap, but large enough to allow free relative vertical movement of the basket 22 in the pot 12.

The outer pot 12 is topped with a cover 30, which may, as is typical, include multiple air vents 32. The cover 30 is removably positioned on the top edge 20 of the outer pot 12, similar to a conventional pot lid. The center of the cover 30 has an aperture 34 through which a shaft 36 passes.

The shaft 36 includes a handle or collar 38 on its upper end and is connected to the cooking basket 22 at its lower end. The shaft 36 is capable of sliding vertically in the cover aperture 34 such that the cooking basket 22 is also free to move in the vertical direction within the outer pot 12. As seen in FIG. 2, when the shaft 36 is in its highest position, the cooking basket 22 is raised above the water line 16, allowing the water to drain from the cooking basket 22 and from the pasta 24 within.

A compression spring 40 is placed around the upper portion of shaft 36, and abuts both the cover 30 and the collar 38. In the position of shaft 36 shown in FIG. 1, the spring 40 is kept in compression between the collar 38 and cover 30. The collar 38 is maintained in the position shown in FIG. 1 by means of its engagement by a detent or pawl 44 received within a notch in the collar (not shown). Detent or pawl 44 is mechanically connected in any conventional manner to a timer 42 mounted on the cover 30 to the side of collar 38. When the shaft 36 is in its lowermost position, illustrated in FIG. 1 as a result of the mechanical engagement of pawl 44 and collar 38, the basket 22 is held under the boiling water and the pasta in the basket is allowed to cook. Although the shaft 36 is illustrated as being centrally oriented within the pot 12 and basket 22, it may be also, if desired, positioned off-axis in the pot and external to the basket.

The timer 42 includes a conventional timer device 46, which can be set manually by the cook to the time desired to cook the pasta. When the timer 46 counts down to zero, the pawl 44 is activated and thereby released from its engagement with the collar 38 as shown in FIG. 2. This disengagement of the pawl and collar allows the previously compressed spring 40 to expand and thereby move the collar 38 and shaft 36 upward, raising the cooking basket 22 upward and one inch above the boiling water 14 and halting the cooking of the pasta 24. The shaft 36 is preferably prevented from completely free travel through the cover aperture 34 to prevent the basket 22 from snapping up too quickly, potentially tossing the pasta 24 out of the basket 22, by the use of a tight-fitting rubber collar 48 mounted at the aperture 34, which applies frictional force around the shaft 36 and acts as a damper on the upward movement of the shaft.

In use, the cover 30 is removed from the outer pot 12, and the uncooked pasta 24 is then placed in the basket 22. To facilitate access to the basket 22, both in loading and unloading, the basket 22 is preferably detachable from the shaft 36, such as by a simple rotation lock. This will also facilitate loading the device components into a dishwasher for cleaning. Water 14 is then added to the outer pot 12 to a level indicated by any suitable indicia on the inner surface of outer pot 12 which level is adequate to submerge basket 22. The pot 12 is then placed on a stove-top burner until the water 14 in the pot comes to a boil.

After the water 14 is boiling, the basket 22 containing the pasta is reattached to the lower end of shaft 36 and lowered into the boiling water. The cover 30 is then fitted onto the pot 12. A downward force is then applied by hand on the collar 38 against the force of the spring 40, until the collar 38 engages the pawl 44, to thereby retain the collar 38 in its lowermost position shown in FIG. 1. Using the timer dial 46, the cook then sets the desired cooking time in the timer 42, which immediately begins counting down.

The pasta 24 will remain submerged in the boiling water until the timer 46 has reached zero, at which point as described above, the pawl 44 is released and the collar 38 moves upward, lifting the basket 22 and the pasta 24 out of the water 14 under the urging of the released compression spring 40. The timer 46 will also preferably sound a brief alarm, such as a bell, to alert the chef that the pasta is ready to eat. Significantly, during the time it takes the chef to remove the pasta from the basket 22, the pasta 24 will be kept moist and warm by steam rising from the still-boiling water 14.

The chef then lifts the cover 30 off of the outer pot 12, removes the basket 22 from the shaft 36, and removes the pasta 24 from the basket. All of the components, including the timer 42, are preferably formed of dishwasher-safe materials. For ease of cleaning, the shaft 36 (once detached from the basket 22) may be completely removed from the cover 30 by pulling upward.

While the present invention has been described as a pasta cooker/preparer, it is to be understood that any food that is prepared by submerging it in boiling water for a selected duration may be used as well. For example, vegetables or eggs may be boiled for a very specific duration, ensuring they are fully cooked to the desired state. Furthermore, other food items such as vegetables may be placed in the basket 22 and steamed above the boiling water without immersion. The timer could be set for any specified time to sound the alarm and alert the cook that steaming has been completed.

Finally, the pasta preparer of the present invention can be modified to contain an electrical heating element (e.g. a hot plate) so that it is self-contained and does not require a stove.

Although the above embodiments are fully capable of achieving the objects and advantages of the invention, various other embodiments as would be apparent to one skilled in the art are considered within the invention. The above detailed description is thus provided for purpose of illustration and not limitation, the invention being only limited by the claims, as follows:

I claim:

1. An automatic food preparer comprising:
   a pot for holding a quantity of a cooking liquid; a basket received within said pot for holding the food product to be prepared; compressible spring means effective when compressed to exert a downward force on said basket to cause said basket to be positioned in a first lower position within said pot; a shaft attached at its lower end to said basket and including a collar at its upper end for engaging and compressing said spring means; a presettable timer; and release means operatively connected to said timer and effective when in a first position to engage said collar so as to maintain said spring means in a compressed state, said release means being movable when actuated by said timer upon the expiration of a preset cooking time interval to a second position at which it releases the compressive force on said spring means, thereby to cause said basket to be raised from its said first lower position to a second, upper position within said pot.

2. The automatic food preparer of claim 1, in which said release means includes a pawl means connected to said timer and engaging said collar and movable to a release position away from said collar when said timer operates for a predetermined period of time.

3. The automatic food preparer of claim 2, in which the compressive force on said spring means is released upon the movement of said pawl to its release position, said spring means thereupon acting to raise said basket to its said second upper position.

* * * * *